US012389517B2

(12) United States Patent
Gleich

(10) Patent No.: US 12,389,517 B2
(45) Date of Patent: Aug. 12, 2025

(54) CONTROLLING AN ELECTRON BEAM GENERATOR FOR A COMPUTED TOMOGRAPHY SCANNER

(71) Applicant: KONINKLIJKE PHILIPS N.V., Eindhoven (NL)

(72) Inventor: Bernhard Gleich, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 159 days.

(21) Appl. No.: 18/027,943

(22) PCT Filed: Sep. 13, 2021

(86) PCT No.: PCT/EP2021/075047
§ 371 (c)(1),
(2) Date: Mar. 23, 2023

(87) PCT Pub. No.: WO2022/063616
PCT Pub. Date: Mar. 31, 2022

(65) Prior Publication Data

US 2023/0371163 A1 Nov. 16, 2023

(30) Foreign Application Priority Data

Sep. 24, 2020 (EP) .................................... 20198041

(51) Int. Cl.
*H05G 1/58* (2006.01)
*H01J 35/14* (2006.01)

(52) U.S. Cl.
CPC ............. *H05G 1/58* (2013.01); *H01J 35/147* (2019.05); *H01J 35/153* (2019.05)

(58) Field of Classification Search
CPC ......... H05G 1/58; H01J 35/153; H01J 35/147
See application file for complete search history.

(56) References Cited

U.S. PATENT DOCUMENTS

| | | | |
|---|---|---|---|
| 7,968,853 | B2 | 6/2011 | Altman |
| 9,870,892 | B2 | 1/2018 | Behling |
| 2010/0104062 | A1 | 4/2010 | Wu |
| 2010/0172475 | A1 | 7/2010 | Behling |

(Continued)

FOREIGN PATENT DOCUMENTS

| | | | |
|---|---|---|---|
| EP | 3294044 | A1 | 3/2018 |
| EP | 3648136 | A1 | 5/2020 |
| JP | 2012109127 | A | 6/2012 |

OTHER PUBLICATIONS

PCT International Search Report, International application No. PCT/EP2021/075047, Feb. 24, 2022.

(Continued)

*Primary Examiner* — Chih-Cheng Kao
(74) *Attorney, Agent, or Firm* — Larry Liberchuk

(57) ABSTRACT

A mechanism for controlling an electron beam generator of an X-ray tube that switches between a low voltage mode and a high voltage mode. The proposed mechanism, during a transition between the low and high voltage modes, controls a power drawn by the electron beam generator. In particular, during a transition from a low voltage mode to a high voltage mode, the drawn power is reduced and, during a transition from a high voltage mode to a low voltage mode, the drawn power is increased.

9 Claims, 5 Drawing Sheets

(56) References Cited

U.S. PATENT DOCUMENTS

| | | | | |
|---|---|---|---|---|
| 2012/0269321 | A1 * | 10/2012 | Behling .................. | H01J 35/24 378/138 |
| 2012/0326031 | A1 | 12/2012 | Wiedmann | |
| 2014/0126698 | A1 | 5/2014 | Behling | |
| 2015/0318138 | A1 | 11/2015 | Konoplev | |
| 2019/0269375 | A1 | 9/2019 | Harrison | |
| 2020/0343069 | A1 * | 10/2020 | Zhu ...................... | A61B 6/4021 |

OTHER PUBLICATIONS

Hyun J. et al., "Optics and Bremsstrahlung Estimates for Channeling Radiation Experiments at FAST". Accelerator Physics, FERMILAB-TM-2672-APCarXiv:1802.06113, 2018, https://arxiv.org/ftp/arxiv/papers/1802/1802.06113.pdf.

* cited by examiner

CONTROLLING AN ELECTRON BEAM GENERATOR FOR A COMPUTED TOMOGRAPHY SCANNER

FIELD OF THE INVENTION

The present invention relates to the field of computed tomography scanners, and in particular, to the control of electron beam generators for use in computed tomography scanners.

BACKGROUND OF THE INVENTION

Computed tomography (CT) is a well-known mechanism for performing imaging of an object/subject. Known CT imaging approaches are performed by transmitting X-rays (such as X-rays) through the subject/object and reconstructing an image from data responsive to received X-rays at the other side of the subject/object.

Typically an X-ray tube (e.g. an X-ray tube) is used to generate the X-rays. An X-ray tube generally operates by using an electron beam generator to generate an electron beam. This electron beam is positioned to be incident upon an X-ray generation surface, which emits X-rays responsive to incident electrons (from the electron beam).

Spectral imaging is becoming an increasingly popular imaging methodology of computed tomography. Spectral imaging is performed by switching a total energy of emitted X-rays between a higher energy level and a lower energy level. This results in different spectra being provided to a subject. One method for performing spectral imaging is to switch a voltage level used to generate the electron beam between a first voltage level and a second voltage level. This is commonly known as kVp switching.

There is a desire to reduce the amount of time taken to switch between the different energy levels for the emitted X-rays.

JP 2012 109127 A discloses an X-ray inspection device.

US 2012/269321 A1 describes an approach for switching the anode potential of an X-ray generating device.

SUMMARY OF THE INVENTION

The invention is defined by the claims.

According to examples in accordance with an aspect of the invention, there is provided a method of controlling an electron beam generator for an X-ray tube of a computed tomography scanner, the electron beam generator being configured to generate an electron beam usable for generating, using an anode of the X-ray tube, X-rays detectable by X-ray detectors of the computed tomography scanner.

The method comprises: controlling the electron beam generator to switch between a low voltage mode, in which a first voltage level is used to generate the electron beam, and a high voltage mode, in which a second voltage level, greater than the first voltage level, is used to generate the electron beam; and controlling the electron beam generator, during a transition from the low voltage mode to the high voltage mode, to reduce a power drawn by the electron beam generator; and/or controlling the electron beam generator, during a transition from the high voltage mode to the low voltage mode, to increase a power drawn by the electron beam generator.

The skilled person will appreciate that during a switch between a low voltage mode and a high voltage mode, there is a transition phase or transition period, in which the voltage level (used to generate the electron beam) ramps up or down.

It would be desirable for the length of this transition phase to be kept to a minimum, to maximize the relative amount of time (e.g. per period of time) that the electron beam generator operates in a particular voltage mode.

The present disclosure recognizes that, for an electron beam generator, a speed of transitioning between a high voltage mode and a low voltage mode can be increased through appropriate control of power drawn by the electron beam generator during the transition.

In particular, reducing a power drawn by the electron beam generator when transitioning from a low voltage mode to a high voltage mode increases the speed at which the voltage level switches from the first (low) voltage level to the second (high) voltage level. Similarly, increasing a power drawn by the electron beam generator when transitioning from a high voltage mode to a low voltage mode increases the speed at which the voltage level switches from the second voltage level to the first voltage level.

Thus, appropriate control over the power drawn by the electron beam generator can control the transition time, i.e. the time taken to transition between different modes of operation.

The electron beam generator comprises an electron beam shaping module, and the method comprises: controlling the electron beam generator, during a transition from the low voltage mode to the high voltage mode, to reduce a power (e.g. current/voltage) drawn by the electron beam shaping module to thereby reduce a power drawn by the electron beam generator; and/or controlling the electron beam generator, during a transition from the high voltage mode to the low voltage mode, to increase a power (e.g. current/voltage) drawn by the electron beam shaping module to thereby increase a power drawn by the electron beam generator.

The present disclosure recognizes that the shape of the electron beam, during the transition between high and low voltage modes is largely irrelevant to the correct operation of the computed tomography scanner (e.g. as information obtained during the transition can be ignored and/or the electron beam can be configured to not be useable for generating any "useful" X-rays). This means that the current drawn by the electron beam generator can be freely modified during the transition period. This embodiment takes advantage of this recognition to facilitate control over the power drawn by the electron beam generator.

In some embodiments, the electron beam shaping module is configured to modify the shape of the electron beam to thereby modify the size of a focal spot, the focal spot being the area of the anode upon which the electron beam is incident, increasing a power drawn by the electron beam shaping module decreases the size of the focal spot, and decreasing a power drawn by the electron beam shaping module increases the size of the focal spot.

Optionally, the electron beam generator comprises an electron beam steering module, wherein the method comprises: using the electron beam steering module to steer the electron beam so that, during transitions between the low voltage mode and the high voltage mode, the electron beam is incident upon an X-ray suppression surface of the anode that suppresses the generation of X-rays, using the electron beam, in directions in which they are detectable by the X-ray detectors of the computed tomography scanner.

To improve a signal to noise ratio of data obtained by the computed tomography scanner, it is preferable that, during transitions, the electron beam does not create any X-rays that are detected by the detectors of the computed tomography scanner. This can be achieved by using an electron beam steering module during a transition phase to direct the electron beam to a surface that does not generate In preferable embodiments, the X-ray suppression surface is designed to suppress the generation of X-rays that are emitted in a direction so that they are able to leave the X-ray tube (e.g. through a window of the X-ray tube). That is, the generation of X-rays themselves may be suppressed, or the X-ray suppression surface may be designed so that a majority (e.g. all) of generated X-rays are unable to exit the X-ray tube.

The X-ray suppression surface may be a beam dump. A beam dump is any suitable material or device that absorbs a beam of charged particles. In the context of the present disclosure, the beam dump absorbs electrons of the electron beam.

In some examples, the method comprises, during transitions from the low voltage mode to the high voltage mode, maintaining the position of the focal spot within the X-ray suppression surface of the anode.

In some examples, the method comprises, during transitions from the high voltage mode to the low voltage mode, fluctuating the position of the focal spot within the X-ray suppression surface of the anode.

In at least one embodiment, the method comprises using the electron beam steering module to steer the electron beam so that, for at least some of the time when the electron beam generator is operating in the low voltage mode or the high voltage mode, the electron beam is at least partially incident upon an X-ray generation surface of the anode that generates, using the electron beam, X-rays in a direction in which they are detectable by the X-ray detectors of the computed tomography scanner.

Thus, when operating in either voltage mode, the electron beam may be incident upon a surface that generates X-rays (from the electron beam). This surface is called an "X-ray generation surface". The X-rays generated by the X-ray generation surface are output to be detected by X-ray detectors (e.g. after passing through an object/subject to be imaged).

The method may further comprise using the electron beam steering module to steer the electron beam so that, immediately before a transition between a low voltage mode and a high voltage mode or vice versa, the electron beam is moved more distant from the X-ray suppression surface before subsequently being moved to become incident upon the X-ray suppression surface.

The inventors have recognized that the time taken to move an electron beam from an X-ray generation surface to an X-ray suppression surface can be reduced if the electron beam is already in motion before attempting to move to the X-ray suppression surface. This is because there is an inherent delay in the electron beam steering module when attempting to move a previously stationary beam.

By steering the electron beam away from the X-ray suppression surface (before steering it thereto), the delay in moving the electron beam is overcome without significantly affecting the amount of X-rays generated by the X-ray generation surface.

The electron beam steering module may comprise a deflector, configured to deflect a path of the electron beam. In some examples, the electron beam steering module comprises one or more coils for deflecting an electron beam and/or an electron beam shaping module. Coils usable for deflecting an electron beam are sometimes called deflection coils or deflection yokes. Examples of the same would be apparent to the skilled person.

The method may further comprises, when the electron beam is incident upon the X-ray generation surface, using the electron beam steering module to fluctuate the position at which the electron beam is incident thereon. Fluctuating the position at which the electron beam is incident upon the X-ray generation surface can spread the heat load on the X-ray generation surface, i.e. avoid the same area or areas being consistently heated by the electron beam.

There is also proposed a computer program product comprising computer program code means which, when executed on a computing device having a processing system, causes the processing system to perform all of the steps of any herein described method.

There is also proposed an electron beam controller configured to control an electron beam generator for an X-ray tube of a computed tomography scanner, the electron beam generator being configured to generate an electron beam usable for generating, using an anode of the X-ray tube, X-rays detectable by X-ray detectors of the computed tomography scanner wherein the electron beam generator comprises an electron beam shaping module.

The electron beam controller is configured to: control the electron beam generator to switch between a low voltage mode, in which a first voltage level is used to generate the electron beam, and a high voltage mode, in which a second voltage level, greater than the first voltage level, is used to generate the electron beam; and control the electron beam generator, during a transition from the low voltage mode to the high voltage mode, to reduce a power drawn by the electron beam shaping module to thereby reduce a power drawn by the electron beam generator; and/or control the electron beam generator, during a transition from the high voltage mode to the low voltage mode, to increase a power drawn by the electron beam shaping module to thereby increase a power drawn by the electron beam generator.

There is also proposed an electron beam generation system comprising: the electron beam controller herein described; and the electron beam generator configured to generate an electron beam usable for generating X-rays detectable by X-ray detectors of the computed tomography scanner.

The electron beam generation system may, for example, be an X-ray tube.

The electron beam generation system may further comprise an anode component comprising: an X-ray suppression surface that is unable to generate X-rays, using the electron beam, in directions in which they are detectable by the X-ray detectors of the computed tomography scanner; and an X-ray generation surface able to generate, using the electron beam, X-rays in a direction in which they are detectable by the X-ray detectors of the computed tomography scanner.

In some examples, the anode component is a rotatable anode, and wherein the X-ray generation system further comprises a rotating mechanism configured to rotate the rotatable anode.

There is also proposed a computed tomography scanner comprising the X-ray generation system herein described.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
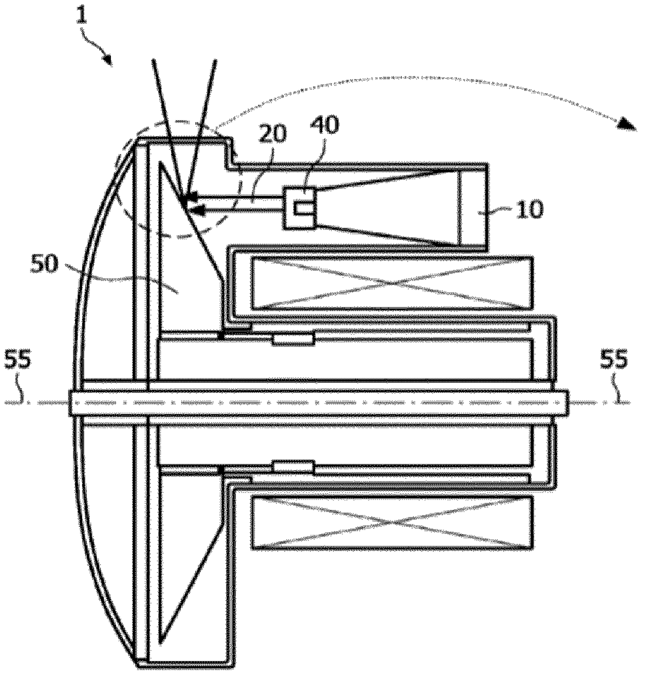
FIG. 1 illustrates an X-ray tube for use in an embodiment.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a mechanism for controlling an electron beam generator of an X-ray tube that switches between a low voltage mode and a high voltage mode. The proposed mechanism, during a transition between the low and high voltage modes, controls a power drawn by the electron beam generator. In particular, during a transition from a low voltage mode to a high voltage mode, the drawn power is reduced and, during a transition from a high voltage mode to a low voltage mode, the drawn power is increased.

Embodiments rely upon the recognition that a transition speed between voltage modes of an electron beam generator can be improved by controlling the power drawn by the electron beam generator during the transitions. Embodiments also rely upon the recognition that the shape/size of the electron beam, during transitions, is largely irrelevant, as electron beam generators (or scanners employing the same) are generally configured to avoid generating X-rays that are used as part of the scanning process.

The proposed concepts can be employed in any suitable electron beam generator of an X-ray tube used for a computed tomography scanner, and find particular use in the medical industry, as well as other industries that employ CT scanners (e.g. the archaeological industry, security industries and so on).

Figure 2:
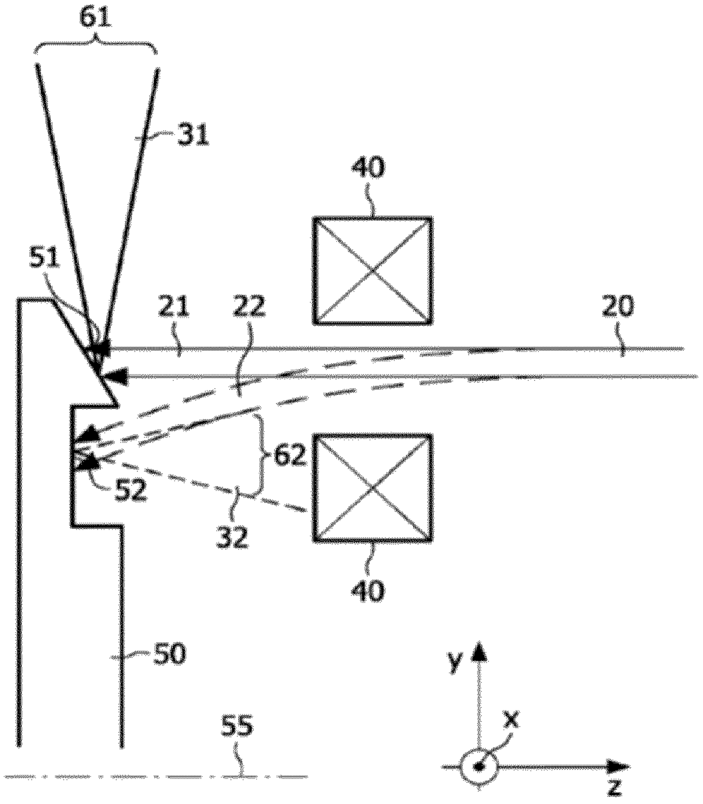
FIG. 2 illustrates a part of the X-ray tube.

FIGS. 1 and 2 are used to describe the operation of an example X-ray tube 1, for use in a computed tomography (CT) scanner, for the purposes of improved contextual understanding. The X-ray tube is an example of an electron beam generation system.

FIG. 1 illustrates a cross sectional view of the X-ray tube 1, sometimes labelled an "X-ray exposure tube", for X-ray generation. The X-ray tube comprises a housing, into which a pivoted or rotatable anode (component) 50 is provided, which anode rotates around a rotational axis 55. The rotation of the rotatable anode is controlled by a rotating mechanism (not shown), the operation of which is readily apparent to the skilled person.

The X-ray tube 1 comprises an electron beam generator 10 (alternatively labelled an electron beam source), which generator is capable of emitting an electron beam 20. The electron beam may be steered (e.g. positioned) by an electron beam steering module 40. The electron beam hits the surface of the anode 50 and owing to its high impact energy generates an electromagnetic ray, in particular an X-ray, which may be emitted via a not particular denoted window on e.g. the lateral side of the X-ray tube. X-rays emitted via the window are subsequently detectable by X-rays sensors of the computed tomography scanner.

It will be apparent that the electron beam generator thereby acts as a cathode for providing an electron beam between the cathode and the anode 50.

Thus, more generally, there is an electron beam generator 10 for an X-ray tube 1 of a computed tomography (CT) scanner. The electron beam generator 10 generates an electron beam 20 usable for generating, using an anode 50 of the X-ray tube 1, X-rays detectable by X-ray detectors of the computed tomography scanner.

FIG. 2 illustrates an enlarged view of the cross sectional view of FIG. 1, in particular the electron beam 20, the electron beam steering module 40 and an example anode configuration for the anode 50.

The electron beam steering module 40 here takes the form of a deflector that deflects a path of the electron beam. The deflector may, for instance, comprise one or more coils, such as the illustrated pair of coils. In this example, if the electron beam steering module 40 remains deactivated, the electron beam propagates without any deflection from the electron beam generator 10 (not shown) to a surface 51 of the anode 50. The electron beam 20 thereby meets the surface of the anode on a first region 51. If the electron beam 20 is deflected, for example, by an activated electron beam steering module 40, the electron beam hits the anode 50 in a second region 52.

The illustrated anode is configured so that, if the electron beam 20 hits the surface of the anode 50 at the first region 51, the electron beam 20 generates an X-ray, in particular an X-ray beam 31 into a first pre-determined direction 61. The first direction 61 is oriented to allow the electromagnetic X-ray radiation to leave the X-ray tube via a particular window (not shown).

The illustrated anode is also configured so that, if the electron beam hits the surface of the anode at the second region 52, then either the electron beam is absorbed, or an X-ray beam 32 is generated in a second direction 62, which is different from and particularly not part of the first pre-determined direction 61.

The second direction 62 (if present) is a direction which does not cover the area of the window (aligned with the first direction 61). Provided that the recess of the region 52 is sufficiently deep in the axial direction and the remaining radial wall structure is sufficiently thick with respect to the penetration capability of the electromagnetic radiation, the anode material attenuates the radiation and prevents/suppresses X-rays being emitted in the direction 61. Thus, by deflecting the electron beam 20 to the second region 52, it may be avoided to emit the possible X-ray beam 32 into the first pre-determined direction 61, so that the amount of X-ray may be controlled by the amount of the deflection.

It should be understood, that the electron beam 20 may also be deflected in a reduced amount, so that only a part of the electron beam 20 in form of a first portion 21 hits the first region 51, wherein the remaining part of the electron beam 20 in form of a second portion 22 will hit the second region 52. Thus, the total amount and intensity, respectively, of the X-ray beam may be influenced by deflecting the electron beam 20.

In this way, the first region 51 of the anode acts as an X-ray generation surface (generating X-rays that exit the X-ray tube) and the second region 52 acts as an X-ray suppression surface (and prevents or suppresses the generation of X-rays that exit the X-ray tube). In particular, the second region 52 can act as a beam dump that effectively absorbs electrons of the electron beam.

Conventionally, the second region is closer to a center of the anode than the first region. The first and second regions may, for example, be concentric to one another (although this is not essential).

For the purposes of the present disclosure, the term "focal spot" is used to refer to the area of the (surface of the) anode upon which the electron beam is incident. Thus, if the focal spot lies in the X-ray generation surface (first region 51), then X-rays are generated in a direction such that they exit the X-ray tube, and if the focal spot lies in the X-ray suppression surface (second region 52), then X-rays are not generated in a direction such that they exit the X-ray tube.

When using a coil or a pair of coils as an electron beam steering module 40, magnetic deflection may be used for deflecting the electron beam. The deflection may be carried out within a very short timeframe, for example, of about 10 microseconds, and over a very short distance, for example, over some millimeters on the target, i.e. the region. The electron beam may have, for example, a typical radial extension of less than 10 millimeters. A deflection may be used to steer a beam from a first region 51 to a second region 52, or vice versa. The second region 52 in this embodiment may be considered as a beam dump region on the anode surface, from where X-rays 32 fail to act as a useful X-ray beam 31 in a pre-determined direction 61. This may result from the recessed dead end construction avoiding an unintended stray of the beam, as well as a defocusing due to changed distances.

Other electron beam steering modules will be apparent to the skilled person, e.g. making use of an electron beam shaping module as later described.

It has previously been explained how spectral imaging is becoming increasingly useful in clinical settings. To perform spectral imaging, the electron beam generator is controlled to operate in at least two different voltage modes. In a low voltage mode, a first voltage level is used to generate the electron beam. In a high voltage mode, a second voltage level, greater than the first voltage level, is used to generate the electron beam.

The voltage level may be represented by the Peak kilovoltage (kVp), which is the maximum high voltage in which the electron beam operates when creating the electron beam. The peak kilovoltage corresponds to the highest kinetic energy of the electrons in an electron beam that is incident upon the anode, and is proportional to the maximum energy of the resulting X-ray emission spectrum.

The first voltage level may, for example, by around 80 kVp and the second voltage level may, for example, be around 140 kVp. However, the skilled person would appreciate that other voltage levels may be used (dependent upon clinical needs and/or requirements).

There is a desire to improve the speed of switching from the low voltage mode to the high voltage mode and vice versa, i.e. decrease the time taken to transition between the voltage modes. The present disclosure relates to approaches for controlling the electron beam generator to reduce the length of the transition time, whilst maintaining anode integrity and avoiding the emission of X-rays during transitions.

More generally, the present disclosure relates to approaches for improving the control of electron beams to improve transitions between voltage modes.

Usually, when switching between a low voltage mode and a high voltage mode, the electron beam is steered or positioned so that the focal spot lies within an X-ray suppression surface during the transition between the low voltage mode and the high voltage mode. This avoids or reduces the number of X-rays exiting the X-ray tube that do not meet the desired energy level for spectral imaging (i.e. avoids X-rays generated at points in between the first and second voltage levels exiting the X-ray tube).

However, it is plausible that alternative methods of preventing X-rays generated during the transition period from affecting the operation of the CT scanner could be used. For instance, some X-ray tubes may employ a shutter than blocks an exit of the X-ray tube during the transition period, another X-ray tube may employ an X-ray filter or "fence" (e.g. that rotates with the rotatable anode) to periodically block generated X-rays, or some CT scanners may be configured to ignore data obtained by X-ray sensors from X-rays generated during the transition period. Thus, the second region 52 (X-ray suppression surface) of the anode may be absent in some examples.

It is proposed to, during a transition between voltage modes, control the power drawn by the electron beam generator. In particular, it is proposed to reduce a power drawn by the electron beam generator when switching from a low voltage mode to a high voltage mode, and to increase a power drawn by the electron beam generator when switching from a high voltage mode to a low voltage mode.

An underlying recognition is that drawing more power when switching from a high voltage mode to a low voltage mode will cause the voltage to drop more quickly, and vice versa.

Figure 3:
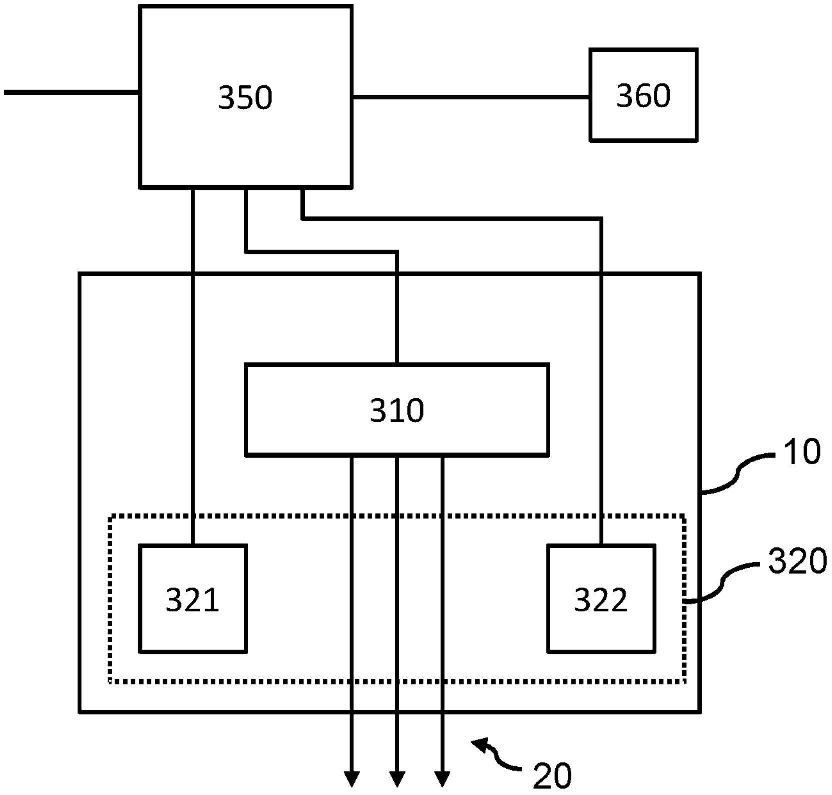
FIG. 3 illustrates a part of the electron beam generator.

FIG. 3 conceptually illustrates a part of the electron beam generator 10. The electron beam generator 5 comprises an electron emitting element 310 and an electron beam shaping module 320.

The electron emitting element 310 emits an electron beam 20 comprising electrons accelerated towards the anode (not shown) by an electric field generated by a voltage source 350. The electron emitting element 310 may comprise, for example, a filament (such as a tungsten filament) or another electron source, such as a crystal (e.g. of $LaB_6$ or $CeB_6$).

The voltage source 350 defines the voltage supplied (e.g. the peak kilovoltage) to the electron beam generator 10, and is controlled by an electron beam controller 360 (e.g. to switch between providing a first voltage level and a second voltage level).

The electron beam controller 360 controls the characteristics of the electron beam 20 emitted by the electron beam generator 10. In particular, the electron beam controller 360 controls whether the electron beam generator operates in the high voltage mode or low voltage mode, by controlling a voltage supplied to the electron beam generator. This may be performed according to some predetermined pattern or protocol for generating X-rays for performing a spectral imaging process, as would be apparent to the skilled person. The electron beam controller 360 also controls a voltage/current drawn by or supplied to the electron beam shaping module.

The electron beam shaping module 320 shapes or focuses the electron beam 20. In particular, the electron beam shaping module 320 may define a size and/or shape of the focal spot on the anode (not shown).

The electron beam shaping module 320 may also be able to (at least partially) steer a direction of the beam, e.g. by controlling the shape of the beam to effectively control a direction of the beam. Thus, the electron beam shaping module 320 may act as (part of) an electron beam steering module.

The illustrated electron beam shaping module 320 comprises a first 321 and second 322 shaping element, although other configurations would be apparent to the skilled person (e.g. only a single shaping element). The shaping elements 321, 322 here comprise electrodes, so that the overall shaping module 320 acts as a control grid. A voltage/current provided to the electrodes modifies the size of the focal spot. Increasing a voltage/current provided to the electrodes decreases the size of the focal spot (as electrodes at the edge of the electron beam are drawn to the electrodes 321, 322). Similarly, decreasing a voltage/current provided to the electrodes increases the size of the focal spot.

According to the present disclosure controlling the power drawn by the electron beam generator during transitions between the voltage modes is performed by controlling the power drawn by the electron beam shaping module 320. This may comprise controlling a voltage/current supplied to the first 321 and second 322 shaping elements.

A proposed approach comprises controlling the electron beam generator, during a transition from the low voltage mode to the high voltage mode, to reduce a voltage/current drawn by the electron beam shaping module to thereby reduce a power drawn by the electron beam generator; and/or controlling the electron beam generator, during a transition from the high voltage mode to the low voltage mode, to increase a voltage/current drawn by the electron beam shaping module to thereby increase a power drawn by the electron beam generator.

The proposed embodiment relies upon the identification that, during a transition between voltage modes, the shape of the focal spot is unimportant (as no X-rays are emitted from the X-ray tube to be detected by X-ray detectors of the CT scanner). Thus, the power supplied to or drawn by the electron beam shaping module 320 can be modified without significantly affecting the operation of the X-ray tube in the context of the CT scanner.

Other approaches (outside the scope of the presently claimed invention) for controlling a power drawn by the electron beam generator, rather than controlling a voltage/current/power supplied to an electron beam shaping module, will be apparent to the skilled person.

For instance, the electron beam generator 10 may comprise additional components that draw power from the voltage source 350, and could be used to control the power drawn by the electron beam shaping module. These additional components may include, for example, an auxiliary electron beam shaping module (not shown) or through voltage control of the electron emitting element.

As another example, a (high-voltage) switch could control a connection between the electron emitting element 310 and the voltage source 350 to control a voltage drawn by the electron emitting element (i.e. define whether or not voltage is drawn). Thus, the electron emitting element may be disconnected from the voltage source during a transition from a first voltage level to a second voltage level (to improve a speed of ramping between the two voltage levels). In this way, the electron emitting element 310 could be prevented from generating an electron beam during a transition between the low voltage mode and the high voltage mode (to increase a speed of the voltage generator 350 switching voltage level.

As yet another example, a switch could control a connection between the voltage source 350 and an auxiliary load (e.g. a resistive element connected between the voltage source 350 and ground). The auxiliary load may be connected to the voltage source 350 during a transition from a second voltage level to a first voltage level, e.g. to draw power during this transition to improve a speed of ramping to the first voltage level.

Of course embodiments may combine all previously described methods for controlling a power drawn by the electron beam generator during transitions.

Figure 4:
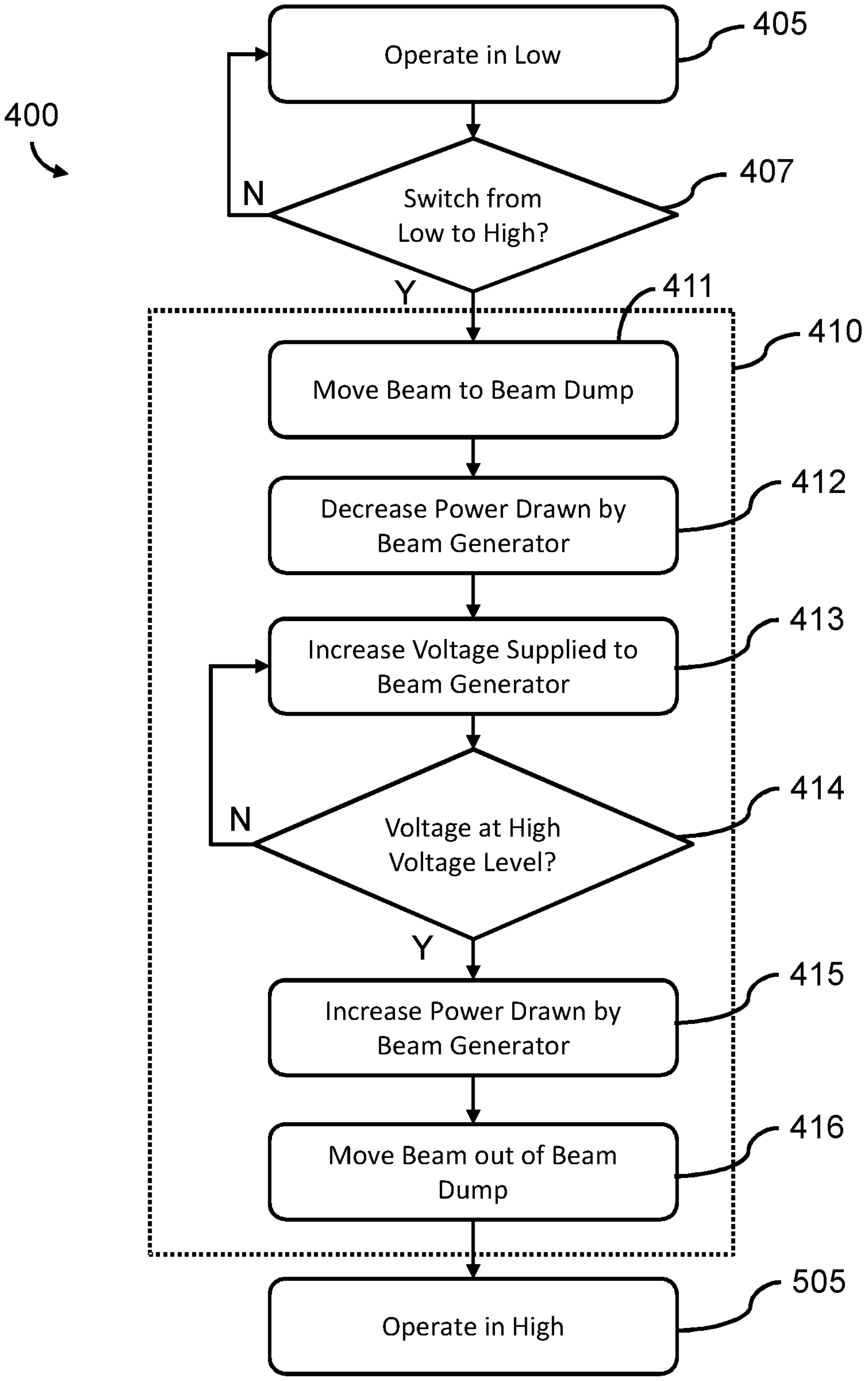
FIG. 4 illustrates a method according to an embodiment.

FIG. 4 illustrates a process 400 for transitioning an electron beam generator between a low voltage mode and a high voltage mode.

Initially, as illustrated by a step 405, the electron beam generator operates in the low voltage mode (e.g. a first voltage level is provided to the electron beam generator by the voltage source).

When there is a desire to switch from the low voltage mode to a high voltage mode (e.g. according to some switching scheme), e.g. as detected or triggered in a step 407, a low to high switching process 410 takes place.

The low to high switching process 410 comprises a step 411 of positioning or steering the electron beam to be incident upon an X-ray suppression surface (e.g. beam dump) of the anode. This step is optional, and could be omitted in some embodiments of the invention (e.g. if a shutter is used or X-rays emitted during the transition are inconsequential to an imaging process).

The low to high switching process 410 further comprises a step 412 of decreasing a power drawn by the electron beam generator. This may comprise decreasing a voltage supplied to the electrode(s) of a beam shaping element. This allows the voltage source to rapidly increase the voltage level provided to the electron beam generator (as less charge is drawn by the electron beam generator, increasing a speed of switching the voltage level).

The low to high switching process 410 also comprises a step 413 of increasing the voltage supplied to the beam generator. As previously explained, compared to existing mechanisms, this step is performed at a faster speed to reduce the transition time.

The voltage is increased until it reaches the second voltage level (e.g. as determined in a step 414).

The low to high switching process 410 then increases the power drawn by the beam generator in a step 415 (e.g. so that it operates in a conventional or standard beam generation protocol for the high voltage mode). This may comprise increasing a voltage supplied to the electrode(s) of a beam shaping element.

The low to high switching process then, in a step 416, positions or steers the electron beam to be incident upon an X-ray generation surface (e.g. moves the beam out of the beam dump). Of course, step 416 does not need to be performed if step 411 is omitted.

The low to high switching process 410 then ends, and the electron beam generator operates in the high voltage mode (during a step 505).

Figure 5:
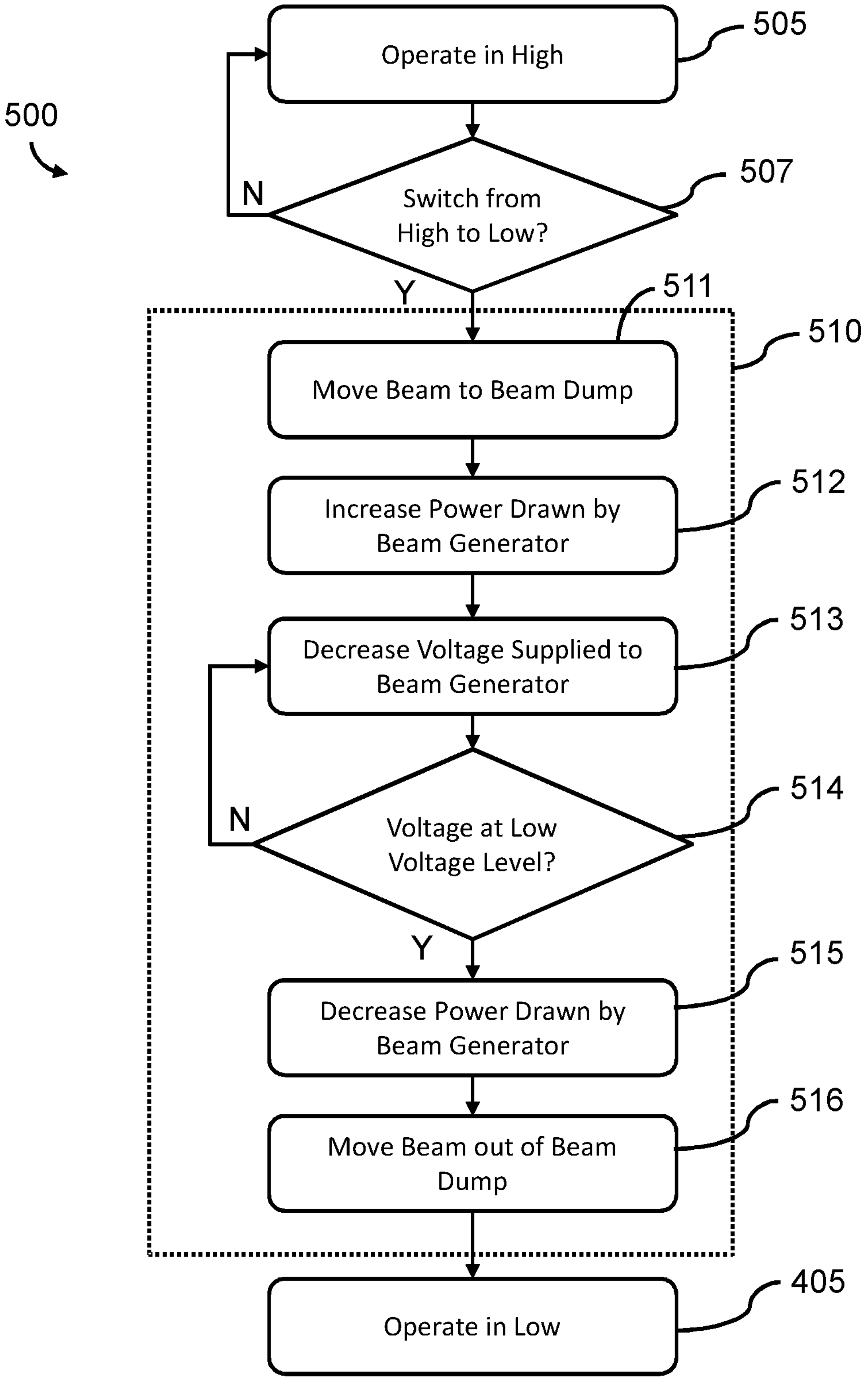
FIG. 5 illustrates a method according to an embodiment.

FIG. 5 illustrates a process 500 for transitioning electron beam generator between the high voltage mode and the low voltage mode.

Initially, as illustrated by a step 505, the electron beam generator operates in the high voltage mode, e.g. a second voltage level (higher than the first voltage level, is provided to the electron beam generator by the voltage source).

When there is a desire to switch from the high voltage mode to a low voltage mode (e.g. according to some switching scheme), e.g. as detected in a step 507, a high to low switching process 510 takes place.

The high to low switching process 510 comprises a step 511 of positioning or steering the electron beam to be incident upon an X-ray suppression surface (e.g. beam dump) of the anode. This step is optional, and could be omitted in some embodiments of the invention (e.g. if a shutter is used or X-rays emitted during the transition are inconsequential to an imaging process).

The high to low switching process 510 further comprises a step 512 of increasing a power drawn by the electron beam generator. This may comprise increasing a voltage supplied to the electrode(s) of a beam shaping element. This allows the voltage source to rapidly decrease the voltage level provided to the electron beam generator (as more charge is drawn by the electron beam generator, increasing a speed of switching the voltage level).

The high to low switching process 510 also comprises a step 513 of decreasing the voltage supplied to the beam generator. As previously explained, compared to existing mechanisms, this step is performed at a faster speed to reduce the transition time.

The voltage is decreased until it reaches the first voltage level (e.g. as determined in a step 514).

The high to low switching process 510 then decreases the power drawn by the beam generator in a step 515 (e.g. until it operates in a conventional or standard beam generation protocol for the low voltage mode). This may comprise decreasing a voltage supplied to the electrode(s) of a beam shaping element.

The high to low switching process then, in a step 516, positions or steers the electron beam to be incident upon an X-ray generation surface (e.g. moves the beam out of the beam dump). Of course, step 516 does not need to be performed if step 511 is omitted.

The high to low switching process then ends, and the electron beam generator operates in the low voltage mode (during a step 405).

In processes 400 and 500 steps 411, 416, 511, 516 can be omitted if alternative mechanisms for preventing X-rays from exiting the X-ray tube or accounting for X-rays emitting the X-ray tube during the transition phases are employed (i.e. other than redirecting the electron beam to the X-ray suppression surface). For instance, some X-ray tubes may employ a shutter that blocks an exit of the X-ray tube during the transition period, or some CT scanners may be configured to ignore data obtained by X-ray sensors from X-rays generated during the transition period.

The process 400, 500 may be performed by the electron beam controller during transitions between the high and low voltage modes.

It has previously been explained how modifying the voltage provided to the electrode(s) of a beam shaping element affects the size/shape of the focal spot (of the electron beam) on the anode. The present disclosure recognizes that, if control of the power drawn by the electron beam generator is performed by controlling a voltage supplied to the electrode(s) or other components of the beam shaping module, some further steps may be taken to improve the operation of the X-ray tube during the transition(s) based on the understanding.

In some examples, during the transition from the low voltage mode to the high voltage mode, the voltage provided to the electrode(s) is reduced. This in turn will increase the size of the focal spot. During this period (e.g. during steps 412 and 413 of process 400), the electron beam may be steered or positioned to be maintained to lie within the X-ray suppression surface. In particular, the center of the electron beam may be moved more completely into the X-ray suppression surface (i.e. more distant from the X-ray generation surface) compared to conventional positioning of the electron beam during a transition. This is to take account of the knowledge that the focal spot will increase in size, and reduce the likelihood of some of the electron beam unintentionally becoming incident with the X-ray generation surface.

In some examples, during the transition from the high voltage mode to the low voltage mode, the voltage provided to the electrode(s) is increased. This in turn decreases the size of the focal spot. During this period (e.g. during steps 512 and 513 of the process 500), the position of the focal spot may be (rapidly) fluctuated or moved back and forth (i.e. "wiggled") within the X-ray suppression surface. Here, the term "position" refers to a position with respect to a center of the anode (i.e. an axis about which the rotatable anode rotates). In other words, the focal spot may be iteratively moved closer and more distant from the center of the rotatable anode within the X-ray suppression surface. This embodiment reduces the average time that a small focal spot will be incident upon a same location (or locations) of the X-ray suppression surface, effectively spreading the heat load on the X-ray suppression surface.

Several approaches for fluctuating the position of the focal spot are envisaged.

In one example, where the electron beam shaping module comprises two or more electrodes (e.g., as in the two electrode case illustrated in FIG. 3), fluctuating the position of the focal spot may comprise alternately providing a high voltage to each electrode in turn or changing the voltages provide to each electrode differently. This will result in the effective position of the focal spot moving as the shape of the beam changes.

In another example, fluctuating the position of the focal spot may comprise (rapidly) modifying the position of the focal spot using the electron beam steering module. Mechanisms for modifying the position of the focal spot using the electron beam steering module have been previously described.

To further reduce the heat load on the X-ray suppression surface, the electron beam shaping module (and/or other elements of the electron beam generator) may control the electron beam to have a focal spot intensity having a multiple peak structure (e.g. multiple points of high/peak intensity). If the focal spot has a multiple peak (e.g. in a radial direction of the rotatable anode), this essentially forms an electron beam having multiple focal spots. This effectively spreads out the heat load on the X-ray suppression surface, as the intensity of each peak will be less than the intensity of a peak of a single-peak structure.

Moreover, a multiple peak structure reduces a distance by which the electron beam needs to be moved/fluctuated to spread the heat load, as the size/intensity of each peak (of a multiple peak structure) will be less than the size of the peak a single-peak structure, meaning that the beam only needs to be moved to non-peak positions to have an improved spread of the power.

To further reduce the heat load on the X-ray suppression surface, the X-ray suppression surface of the anode may be designed to comprise two or more grooves (e.g. into which the focal spot falls). This effectively increases the surface area of the X-ray suppression surface, so that heat is more effectively spread out.

Another approach for reducing the heat load on the X-ray suppression surface could be to further reduce the voltage provided to the electron beam generator whilst the focal spot is on the X-ray suppression surface. This approach could be employed, for example, during a period in which there is no desire to generate X-rays for imaging a subject (e.g. whilst the subject is moving) or when switching a mode of operation of the X-ray tube (e.g. to generate lower intensity X-rays).

In previously described embodiments, it has been described how, during transitions between low and high voltage modes, the focal spot is positioned to fall in an X-ray suppression surface. However, it is also herein recognized that it takes some time to move the electron beam from the X-ray generation surface to the X-ray suppression surface, which increases the transition time between the low and high voltage modes.

To improve the speed of moving the electron beam, it is herein proposed to use the electron beam steering module to steer the electron beam so that, immediately before (e.g. within 1 μs to 5 μs before) a transition between a low voltage mode and a high voltage mode or vice versa, the electron beam is moved more distant from the X-ray suppression surface before subsequently being moved to become incident upon the X-ray suppression surface.

Prior to this movement, the electron beam may be incident upon the X-ray generation surface.

Here, the term "more distant" refers to a distance with respect to a line extending from a center of the anode (e.g. an axis about which the rotatable anode rotates). In other words, if the X-ray suppression surface is located more closely to the center of the anode than the X-ray generation surface, this process may comprise initially moving the focal spot to be more distant from the center of the rotatable anode. Similarly, if the X-ray suppression surface is located more distant from the center of the anode than the X-ray generation surface, this process may comprise initially moving the focal spot to be closer to the center of the rotatable anode.

It is recognized that the speed of movement of the electron beam typically takes some time to accelerate to a maximum possible speed. This is because the electron beam steering module needs to "warm up" (i.e. overcome inertia) before reaching a maximum speed of movement. Thus, there is not much movement when initially steering away from the X-ray suppression surface.

Similarly, a delay is also seen due to the eddy currents in the housing of the X-ray tube. The delay acts in a very similar way and is also compensated using the proposed steering approach.

Thus, the time taken to move from the X-ray generation surface to the X-ray suppression surface, during a transition between the voltage modes, can be reduced by initiating a movement of the electron beam away from the X-ray suppression surface before the transition (so that X-rays continue to be generated before the transition), before moving the electron beam towards the X-ray suppression surface.

In particular, when the electron beam is steered a little in the opposite direction, not much movement of the beam can be observed, but when back at the original position, the speed of the electron beam is already high. This effectively gives a "running start" to the movement of the electron beam.

The length of time that the electron beam is moved more distant from the X-ray suppression surface is preferably no more than 5 μs, e.g. no more than 2 μs. In some examples, this length of time is in the region of between 1 μs and 2 μs.

This approach is particularly advantageous when the electron beam steering module comprises one or more coils for deflecting the magnetic beam, as, for such coils, there is a delay in charging the voltage of the coils which is overcome by initially steering the beam away from the X-ray suppression surface.

Moving the electron beam away from the X-ray suppression surface may result in the electron beam becoming incident on other components of the X-ray tube apart from the X-ray generation surface. However, provided that the length of time that the electron beam is moved more distant from the X-ray suppression surface is sufficiently small (e.g. <2 μs), the thermal load on these other components is sufficiently low that there is no adverse effect.

Although particularly advantageous when used with the other elements of the invention, by contributing to an increased transition speed. The proposed approach for initially moving an electron beam (before a transition) may be used independently of the approach for controlling a power drawn by the electron beam generator during transitions.

Thus, there is also proposed a method of controlling an electron beam generator for an X-ray tube of a computed tomography scanner, the electron beam generator being configured to generate an electron beam usable for generating, using an anode of the X-ray tube, X-rays detectable by X-ray detectors of the computed tomography scanner, wherein the electron beam generator comprises an electron beam steering module, the method comprising: controlling the electron beam generator to switch between a low voltage mode, in which a first voltage level is used to generate the electron beam, and a high voltage mode, in which a second voltage level, greater than the first voltage level, is used to generate the electron beam; and using the electron beam steering module to steer the electron beam so that, immediately before a transition between a low voltage mode and a high voltage mode or vice versa, the electron beam is moved more distant from an X-ray suppression surface before subsequently being moved to become incident upon the X-ray suppression surface.

Figure 6:
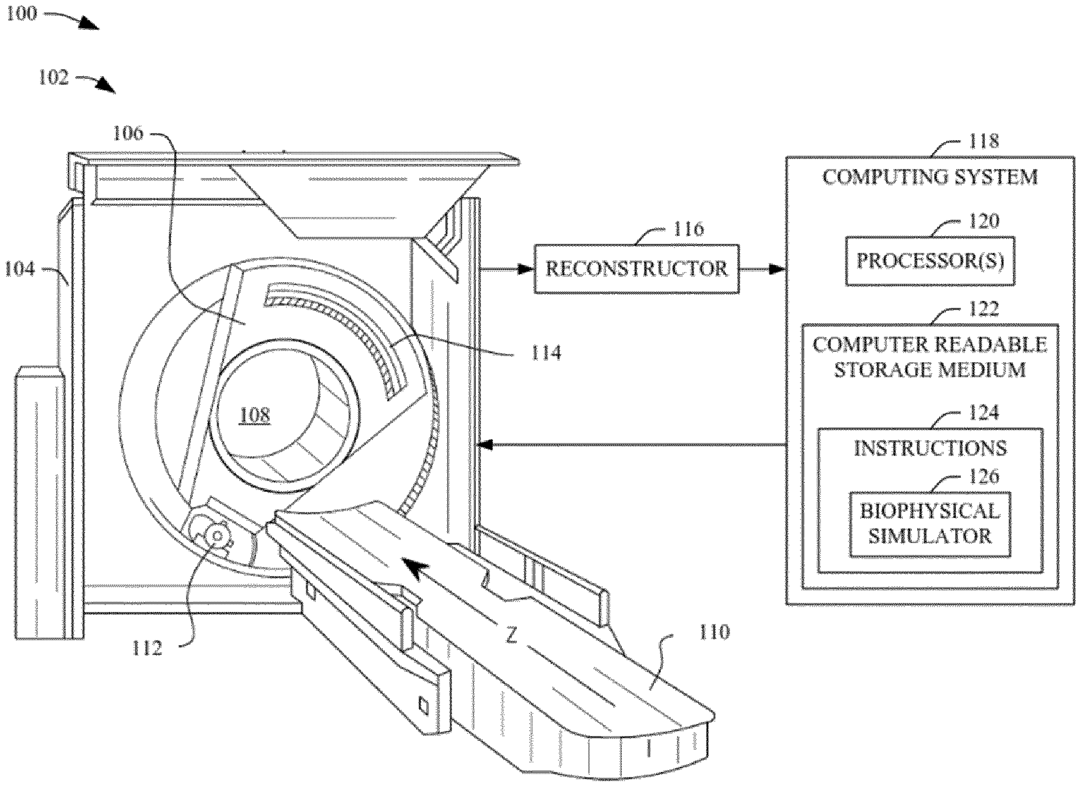
FIG. 6 illustrates a system having a CT scanner.

For the sake of improved contextual understanding, FIG. 6 schematically illustrates a system 100 including an imaging system 102 such as a CT scanner configured for spectral (multi-energy) imaging. The imaging system 102 includes a generally stationary gantry 104 and a rotating gantry 106, which is rotatably supported by the stationary gantry 104 and rotates around an examination region 108 about a z-axis. A subject support 110, such as a couch, supports an object or subject in the examination region 108.

A radiation source 112, such as an x-ray tube, is rotatably supported by the rotating gantry 106, rotates with the rotating gantry 106, and emits radiation that traverses the examination region 108. In the context of the present invention, the radiation source 112 includes an x-ray tube configured to switch between at least two different emission voltages (e.g., 80 kVp and 140 kVp) during scanning, i.e. operate in at least two voltage modes. In yet another instance, the radiation source 112 includes two or more x-ray tubes configured to emit radiation having different mean spectra. In still another instance, the radiation source 112 includes a combination thereof.

A radiation sensitive detector array 114 subtends an angular arc opposite the radiation source 112 across the examination region 108. The radiation sensitive detector array 114 detects radiation traversing the examination region 108 and generates an electrical signal(s) (projection data) indicative thereof. Where the radiation source 112 includes a single broad spectrum x-ray tube, the radiation sensitive detector array 112 includes energy-resolving detectors (e.g., direct conversion photon counting detectors, at least two sets of scintillators with different spectral sensitivities (multi-layer), etc.). With kVp switching and multi-tube configurations, the detector array 114 can include single layer detectors, direct conversion photon counting detectors, and/or multi-layer detectors. The direct conversion photon counting detectors may include a conversion material such as CdTe, CdZnTe, Si, Ge, GaAs, or other direct conversion material. An example of multi-layer detector includes a double decker detector such as the double decker detector described in U.S. Pat. No. 7,968,853 B2, filed Apr. 10, 2006, and entitled "Double Decker Detector for Spectral CT," the entirety of which is incorporated herein by reference.

A reconstructor 116 receives spectral projection data from the detector array 114 and reconstructs spectral volumetric image data such as sCCTA image data, a high-energy image, a low energy image, a photoelectric image, a Compton scatter image, an iodine image, a calcium image, a virtual non-contrast image, a bone image, a soft tissue image, and/or other basis material image. The reconstructor 116 can also reconstruct non-spectral volumetric image data, e.g., by combining spectral projection data and/or spectral volumetric image data. Generally, the spectral projection data and/or spectral volumetric image data will include data for at least two different energies and/or energy ranges.

A computing system 118 serves as an operator console. The console 118 includes a human readable output device such as a monitor and an input device such as a keyboard, mouse, etc. Software resident on the console 118 allows the operator to interact with and/or operate the scanner 102 via a graphical user interface (GUI) or otherwise. The console 118 further includes a processor 120 (e.g., a microprocessor, a controller, a central processing unit, etc.) and a computer readable storage medium 122, which excludes non-transitory medium, and includes transitory medium such as a physical memory device, etc.

The computer readable storage medium 122 includes instructions 124 for carrying out one or more tasks using the processor. The processor 120 is configured to execute the instructions 124. The processor 120 may additionally be configured to execute one or more computer readable instructions carried by a carrier wave, a signal and/or other transitory medium. In a variation, the processor 120 and the computer readable storage medium 122 are part of another computing system, which is separate from the computing system 118.

As discussed above, embodiments make use of a (electron beam) controller. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor or controller.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A method of controlling an electron beam generator for an X-ray tube of a computed tomography (CT) scanner, the method comprising:

generating an electron beam for generating X-rays detectable by X-ray detectors of the CT scanner, wherein the electron beam generator comprises an electron beam shaping module;

controlling the electron beam generator to switch between a low voltage mode and a high voltage mode, wherein a first voltage level is used to generate the electron beam in the low voltage mode, and wherein a second voltage level, greater than the first voltage level, is used to generate the electron beam in the high voltage mode;

during a transition from the low voltage mode to the high voltage mode, reducing power drawn by the electron beam shaping module such that the power drawn by the electron beam generator is reduced; and during a transition from the high voltage mode to the low voltage mode, increasing the power drawn by the electron beam shaping module such that the power drawn by the electron beam generator is increased.

2. The method of claim 1, further comprising:

modifying a shape of the electron beam to modify the size of a focal spot, the focal spot being the area of an anode upon which the electron beam is incident;

increasing the power drawn by the electron beam shaping module such that the size of the focal spot is decreased; and decreasing the power drawn by the electron beam shaping module such that the size of the focal spot is increased.

3. The method of claim 1, further comprising:

using the electron beam shaping module to steer the electron beam so that, during the transition between the low voltage mode and the high voltage mode, the electron beam is incident upon an X-ray suppression surface of an anode that suppresses generating the X-rays in directions in which the X-rays are detectable by the X-ray detectors of the CT scanner.

4. The method of claim 3, wherein the X-ray suppression surface is a beam dump.

5. The method of claim 3, further comprising maintaining a position of the focal spot within the X-ray suppression surface of the anode during the transition from the low voltage mode to the high voltage mode.

6. The method of claim 3, further comprising fluctuating a position of the focal spot within the X-ray suppression surface of the anode during the transition from the high voltage mode to the low voltage mode.

7. The method of claim 3, further comprising:

using the electron beam shaping module to steer the electron beam so that, for at least some of the time when the electron beam generator is operating in the low voltage mode or the high voltage mode, the electron beam is at least partially incident upon an X-ray generation surface of the anode that generates X-rays in a direction in which the X-rays are detectable by the X-ray detectors of the CT scanner.

8. The method of claim 7, further comprising:

using the electron beam shaping module to steer the electron beam so that, immediately before the transition between the low voltage mode and the high voltage mode or vice versa, the electron beam is moved farther from the X-ray suppression surface before subsequently being moved to become incident upon the X-ray suppression surface.

9. A system for controlling an electron beam for an X-ray tube of a computed tomography (CT) scanner, comprising:

an electron beam generator configured to generate the electron beam for generating X-rays detectable by X-ray detectors of the CT scanner, wherein the electron beam generator comprises an electron beam shaping module; and an electron beam controller configured to:

control the electron beam generator to switch between a low voltage mode and a high voltage mode, wherein a first voltage level is used to generate the electron beam in the low voltage mode, and wherein a second voltage level, greater than the first voltage level, is used to generate the electron beam in the high voltage mode;

during a transition from the low voltage mode to the high voltage mode, reduce power drawn by the electron beam shaping module such that the power drawn by the electron beam generator is reduced; and during a transition from the high voltage mode to the low voltage mode, increase the power drawn by the electron beam shaping module such that the power drawn by the electron beam generator is increased.

* * * * *